United States Patent
Ohno (10) Patent No.: US 6,657,651 B2
(45) Date of Patent: Dec. 2, 2003

(54) OPTICAL WRITING HEAD AND METHOD OF CORRECTING THE DEVIATION OF A LINE OF LIGHT SPOTS

(75) Inventor: Seiji Ohno, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/031,281

(22) Filed: Nov. 13, 2001

(65) Prior Publication Data

US 2003/0007063 A1 Jan. 9, 2003

(30) Foreign Application Priority Data

Mar. 16, 2000 (JP) .......................................... 2000-73420

(51) Int. Cl.$^7$ .............................. B41J 2/435; B41J 15/14
(52) U.S. Cl. ....................................... 347/235; 347/244
(58) Field of Search .................................. 347/130, 238, 347/241, 256, 232, 235, 249, 250, 251, 234, 244, 258; 355/67

(56) References Cited

U.S. PATENT DOCUMENTS 5,933,181 A * 8/1999 Shimizu et al. ............. 347/232
6,184,971 B1 * 2/2001 Narita et al. .................. 355/67

FOREIGN PATENT DOCUMENTS

| JP | 4-296579 | 10/1992 | |
| JP | 9-150543 | 6/1997 | |
| JP | 9-311664 | * 12/1997 | ............ G09G/3/32 |
| JP | 10-114101 | 5/1998 | |
| JP | 11-286136 | 10/1999 | |

* cited by examiner

Primary Examiner—Hai Pham
(74) Attorney, Agent, or Firm—RatnerPrestia (57) ABSTRACT

An optical writing head is provided in which the deviation of a line of light spots on the photosensitive drum in a sub-scanning direction due to manufacturing dispersion of a rod-lens array is corrected. In the optical writing head comprising a self-scanning light-emitting element array and a rod-lens array for projecting light emitted from the self-scanning light-emitting element array onto the photosensitive drum, the timing of a start pulse supplied to the start pulse line every chip is regulated to correct the deviation of the line of light spots.

6 Claims, 9 Drawing Sheets

OPTICAL WRITING HEAD AND METHOD OF CORRECTING THE DEVIATION OF A LINE OF LIGHT SPOTS

TECHNICAL FIELD

The present invention relates to an optical writing head, in particular to an optical writing head in which the deviation of a line of light spots due to manufacturing dispersion of a rod-lens array. The present invention further relates to a method of correcting the deviation of a line of light spots.

BACKGROUND ART

Figure 1:
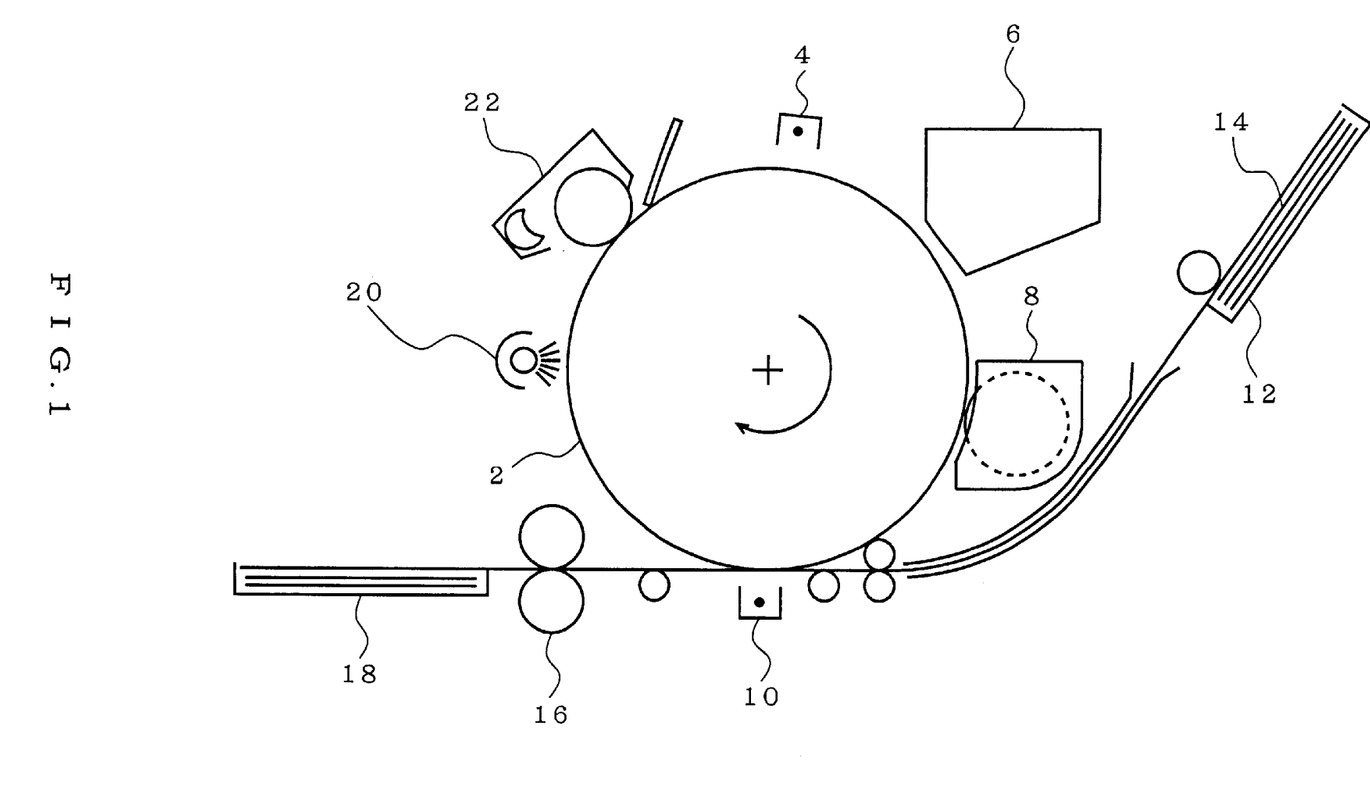
FIG. 1 is a schematic diagram of an optical printer comprising an optical writing head.

A writing head of an optical printer, i.e. an optical writing head is a light source for exposing a photosensitive drum and comprises a line of light-emitting points consisting of a light-emitting element array. The structure of an optical printer including an optical writing head is shown in FIG. 1. An optically conductive material (photosensitive material) such as amorphous Si is provided on the surface of a cylindrical drum 2, which is rotated at the printing speed. The surface of the photosensitive material is uniformly charged with an electrostatic charger 4. Then, light corresponding to a dot image being printed with an optical writing head 6 is projected onto the surface of the photosensitive material to neutralize the charge on the area to which the light is projected. Next, a developer 8 deposits the toner on the photosensitive material surface in accordance with the charged pattern on the photosensitive material surface. The transfer unit 10 transfers the toner on a paper sheet 14 fed from a cassette 12. The toner on the paper sheet is thermally fixed by the heat applied by a fixer 16, and the paper is sent to a stacker 18. Upon completion of transfer, on the other hand, the charge on the drum is neutralized over the entire surface with an erasing lamp 20, and the remaining toner is removed by a cleaner 22.

Figure 2:
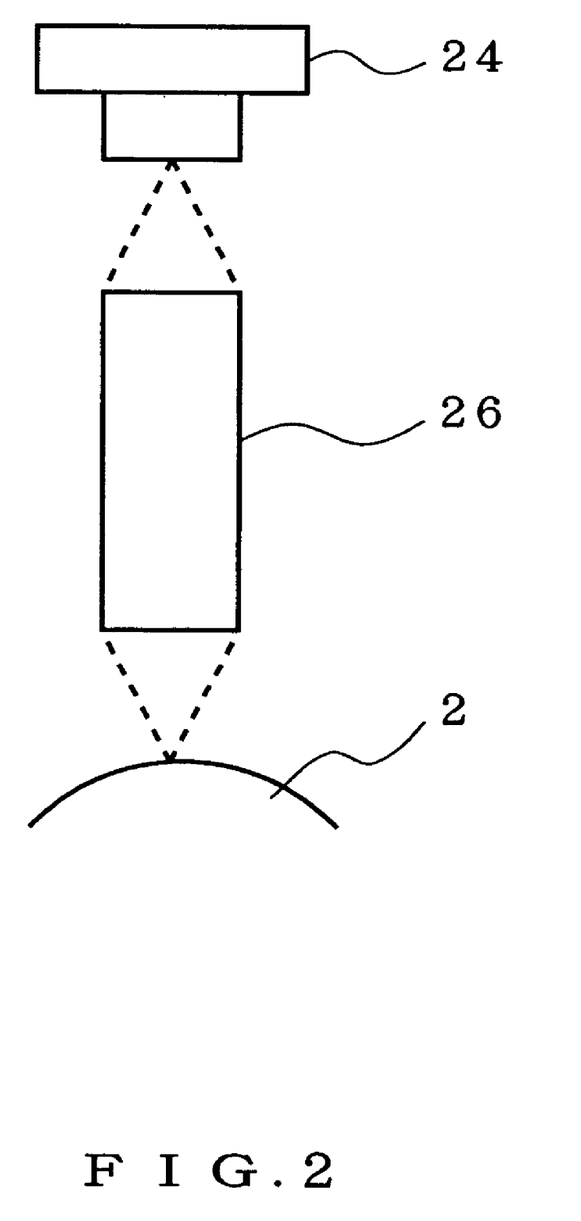
FIG. 2 is a schematic diagram of the structure of an optical writing head.

The construction of the optical print head 6 is shown in FIG. 2. This optical print head comprises a light-emitting element array 24 and a rod-lens array 26, and the lens is adapted so as to focus on the photosensitive drum 2. The rod-lens array be composed of alternately stacked rod lenses, for example.

The inventors of the present invention have interested in a three-terminal light-emitting thyristor having a PNPN-structure as an element of the light-emitting element array, and have already filed several patent applications (see Japanese Patent Publication Nos. 1-238962, 2-14584, 2-92650, and 2-92651.) These patent publications have disclosed that a self-scanning function for light-emitting elements may be implemented, and further have disclosed that such self-scanning light-emitting element array has a simple and compact structure for the light source of a printer, and has smaller array pitch of thyristors.

The inventors have further provided a self-scanning light-emitting element array having such structure that an array of light-emitting thyristors having transfer function is separated from an array of light-emitting thyristors having writable function (see Japanese Patent Publication No. 2-263668.)

Figure 3:
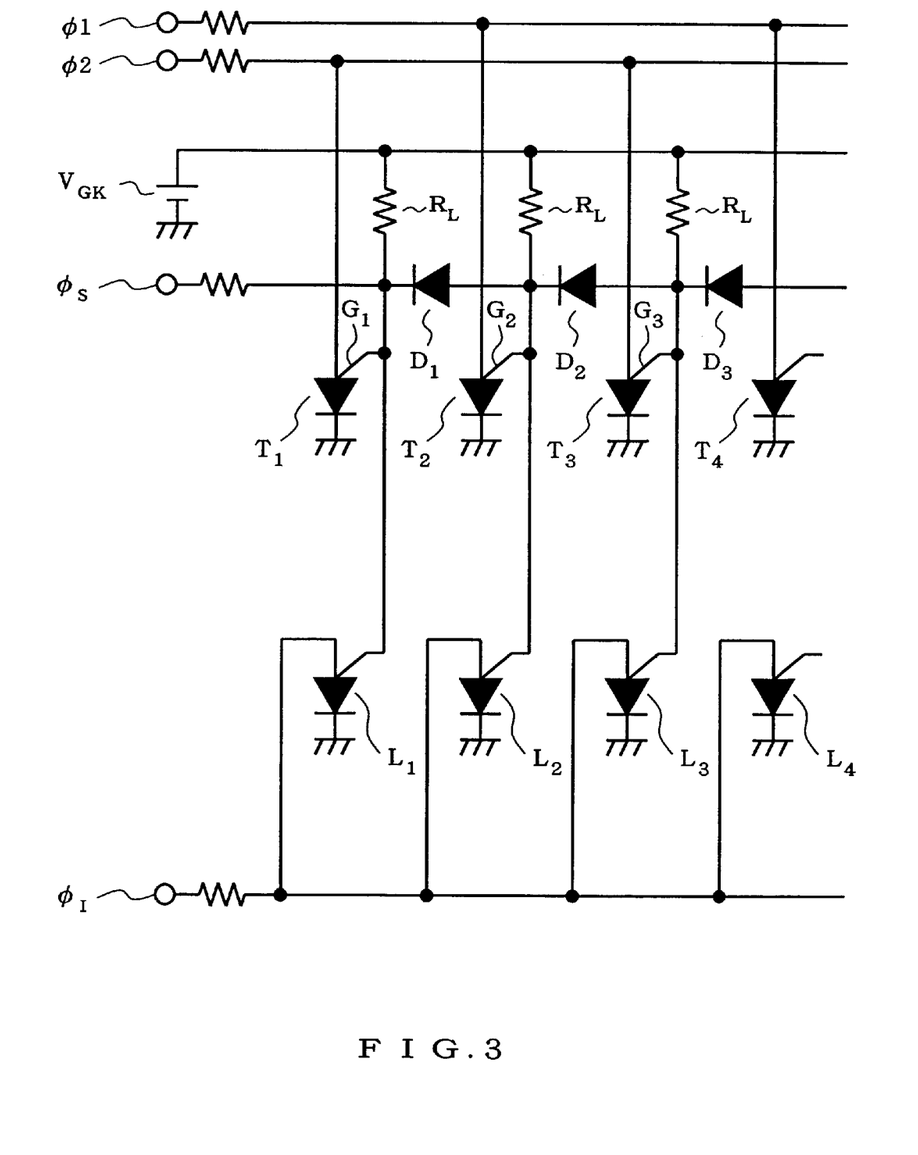
FIG. 3 is an equivalent circuit diagram of a self-scanning light-emitting element array (two-phase driving, cathode common type).

Referring to FIG. 3, there is shown an equivalent circuit diagram of a fundamental structure of this self-scanning light-emitting element array (two-phase driving and cathode common type). According to this structure, the light-emitting element array comprises transfer elements $T_1$, $T_2$, $T_3$ . . . and writable light-emitting elements $L_1$, $L_2$, $L_3$ . . . , these elements consisting of three-terminal light-emitting thyristors. The structure of the portion of an array of transfer elements includes diode $D_1$, $D_2$, $D_3$ . . . as means for electrically connecting the gate electrodes of the neighboring transfer elements to each other. $V_{GK}$ is a power supply (normally 5 volts), and is connected to all of the gate electrodes $G_1$, $G_2$, $G_3$ . . . of the transfer elements via a load resistor $R_L$, respectively. Respective gate electrodes $G_1$, $G_2$, $G_3$ . . . are correspondingly connected to the gate electrodes of the writable light-emitting elements $L_1$, $L_2$, $L_3$ . . . . A start pulse $\phi_S$ is applied to the gate electrode of the transfer element $T_1$, transfer clock pulses $\phi 1$ and $\phi 2$ are alternately applied to all of the anode electrodes of the transfer elements, and a write signal $\phi_I$ is applied to all of the anode electrodes of the light-emitting elements.

The operation of this self-scanning light-emitting device will now be described briefly. Assume that as the transfer clock $\phi 1$ is driven to a high level, the transfer element $T_2$ is now turned on. At this time, the voltage of the gate electrode $G_2$ is dropped to a level near zero volt from 5 volts. The effect of this voltage drop is transferred to the gate electrodes $G_3$ via the diode $D_2$ to cause the voltage of the gate electrode $G_3$ to set about 1 volt which is a forward rise voltage (equal to the diffusion potential) of the diode $D_2$. On the other hand, the diode $D_1$ is reverse-biased so that the potential is not conducted to the gate $G_1$, then the potential of the gate electrode $G_1$ remaining at 5 volts. The turn on voltage of the light-emitting thyristor is approximated to a gate electrode potential+a diffusion potential of PN junction (about 1 volt.) Therefore, if a high level of a next transfer clock pulse $\phi 2$ is set to the voltage larger than about 2 volts (which is required to turn-on the transfer element $T_3$) and smaller than about 4 volts (which is required to turn on the transfer element $T_5$), then only the transfer element $T_3$ is turned on and other transfer elements remain off-state, respectively. As a result of which, on-state is transferred from $T_2$ to $T_3$. In this manner, on-state of transfer elements are sequentially transferred by means of two-phase clock pulses.

The start pulse $\phi_S$ works for starting the transfer operation described above. When the start pulse $\phi_S$ is driven to a low level (about 0 volt) and the transfer clock pulse $\phi 2$ is driven to a high level (about 2–4 volts) at the same time, the transfer element $T_1$ is turned on. Just after that, the start pulse $\phi_S$ is returned to a high level.

Assuming that the transfer element $T_2$ is in the on-state, the voltage of the gate electrode $G_2$ is lowered to almost zero volt. Consequently, if the voltage of the write signal $\phi_I$ is higher than the diffusion potential (about 1 volt) of the PN junction, the light-emitting element $L_2$ may be turned into an on-state (a light-emitting state.)

On the other hand, the voltage of the gate electrode $G_1$ is about 5 volts, and the voltage of the gate electrode $G_3$ is about 1 volt. Consequently, the write voltage of the light-emitting element $L_1$ is about 6 volts, and the write voltage of the light-emitting element $L_3$ is about 2 volts. It follows from this that the voltage of the write signal $\phi_I$ which can write into only the light-emitting element $L_2$ is in a range of about 1–2 volts. When the light-emitting element $L_2$ is turned on, that is, in the light-emitting state, the amount of light thereof is determined by the write signal $\phi_I$. Accordingly, the light-emitting elements may emit light at any desired amount of light. In order to transfer on-state to the next element, it is necessary to first turn off the element in on-state by temporarily dropping the voltage of the write signal $\phi_I$ down to zero volts.

The self-scanning light-emitting element array described above may be fabricated by arranging a plurality of light-emitting element array chips in one line so as to have a desired number of light-emitting points.

Figure 4:
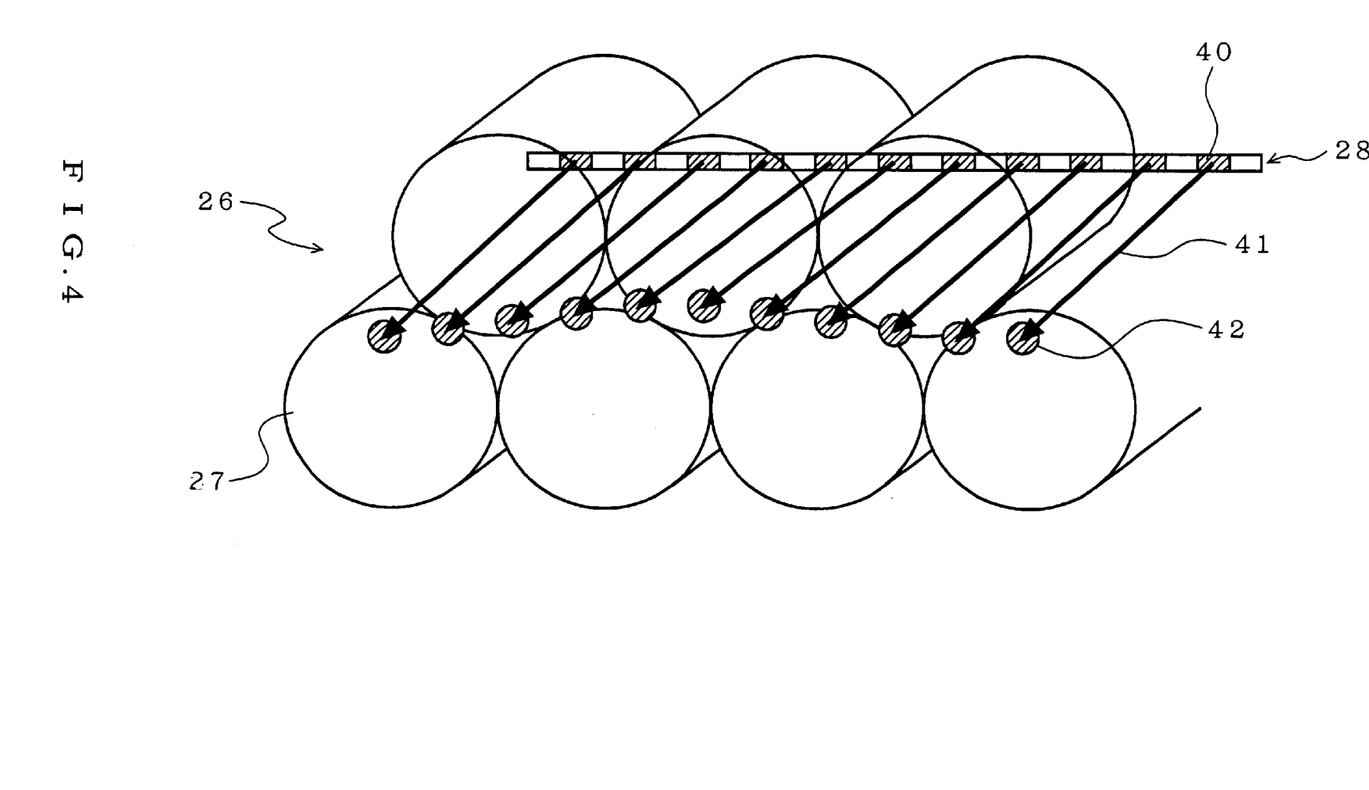
FIG. 4 is a diagram showing the condition where a line of light spots is deviated in a sub-scanning direction.

In an optical writing head using such self-scanning light-emitting element array, there is a problem in that a line of light spots which are projected on the photosensitive drum is deviated from a straight line in a sub-scanning direction due to the manufacturing dispersion of a rod-lens array. FIG. 4 shows the condition where a line of light spots is deviated in a sub-scanning direction. The light 41 emitted from each light-emitting point 40 of a straight-line light-emitting element array 28 passes through a rod-lens array 26 constructed by alternately stacked rod-lenses 27. The light passed through the rod-lens array is projected onto the photosensitive drum (not shown) to form a line of light spots 42.

It is apparent from the figure that a line of light spots deviates in a sub-scanning direction to draw a slightly convex line. It is noted herein that the sub-scanning direction is a direction perpendicular to an axis of rotation of the drum. A main-scanning direction is that in parallel with the axis of rotation of the photosensitive drum.

DISCLOSURE OF THE INVENTION

An object of the present invention is to provide an optical writing head in which the deviation of a line of light spots on the photosensitive drum in a sub-scanning direction due to manufacturing dispersion of a rod-lens array is corrected.

Another object of the present invention is to provide a method of correcting a deviation of light spots due to manufacturing dispersion of a rod-lens array.

According to the first aspect of the present invention, an optical writing head is provided, which comprises:

a self-scanning light-emitting element array consisting of a plurality of chips, each chip including a self-scanning transfer element array having such a structure that a plurality of three-terminal transfer elements each having a control electrode for controlling threshold voltage or current are arranged, the control electrodes of the transfer elements neighbored to each other are connected via first electrical means, a power supply line is connected to the control electrodes via second electrical means, clock lines are connected to one of two terminals other than the control electrodes of each of the transfer elements, and a start pulse line is connected to the control electrode of the transfer element arranged at an end; and a light-emitting element array having such a structure that a plurality of three-terminal light-emitting elements each having a control electrode for controlling threshold voltage or current are arranged, the control electrodes of the light-emitting element are correspondingly connected to the control electrodes of the transfer elements, and a line for applying a write signal connected to one of two terminals other than the control electrode of each of the light-emitting elements is provided, and a rod-lens array for projecting light emitted from the self-scanning light-emitting element array onto a lightsensitive drum to form a line of light spots, wherein the timing of a start pulse supplied to the start pulse line every chip is regulated to correct the deviation of the line of light spots due to manufacturing dispersion of the rod-lens.

According to the second aspect of the present invention, an optical writing head is provided, which comprises:

a self-scanning light-emitting element array consisting of a plurality of chips, each chip including a self-scanning transfer element array having such a structure that a plurality of three-terminal transfer elements each having a control electrode for controlling threshold voltage or current are arranged, the control electrodes of the transfer elements neighbored to each other are connected via first electrical means, a power supply line is connected to the control electrodes via second electrical means, clock lines are connected to one of two terminals other than the control electrodes of each of the transfer elements, and a start pulse line is connected to the control electrode of the transfer element arranged at an end; and a light-emitting element array having such a structure that a plurality of three-terminal light-emitting elements each having a control electrode for controlling threshold voltage or current are arranged, the control electrodes of the light-emitting element are correspondingly connected to the control electrodes of the transfer elements, and a line for applying a write signal connected to one of two terminals other than the control electrode of each of the light-emitting elements is provided, and a rod-lens array for projecting light emitted from the self-scanning light-emitting element array onto a lightsensitive drum to form a line of light spots, wherein the plurality of chips are divided into blocks each consisting of a given number of chips, one start pulse line is provided every block, and the timing of a start pulse supplied to the one start pulse line is regulated every block to correct the deviation of the line of light spots due to manufacturing dispersion of the rod-lens.

BEST MODE FOR CARRYING OUT THE INVENTION

The embodiments of the present invention will now be described with reference to the drawings.

EMBODIMENT 1

Figure 5:
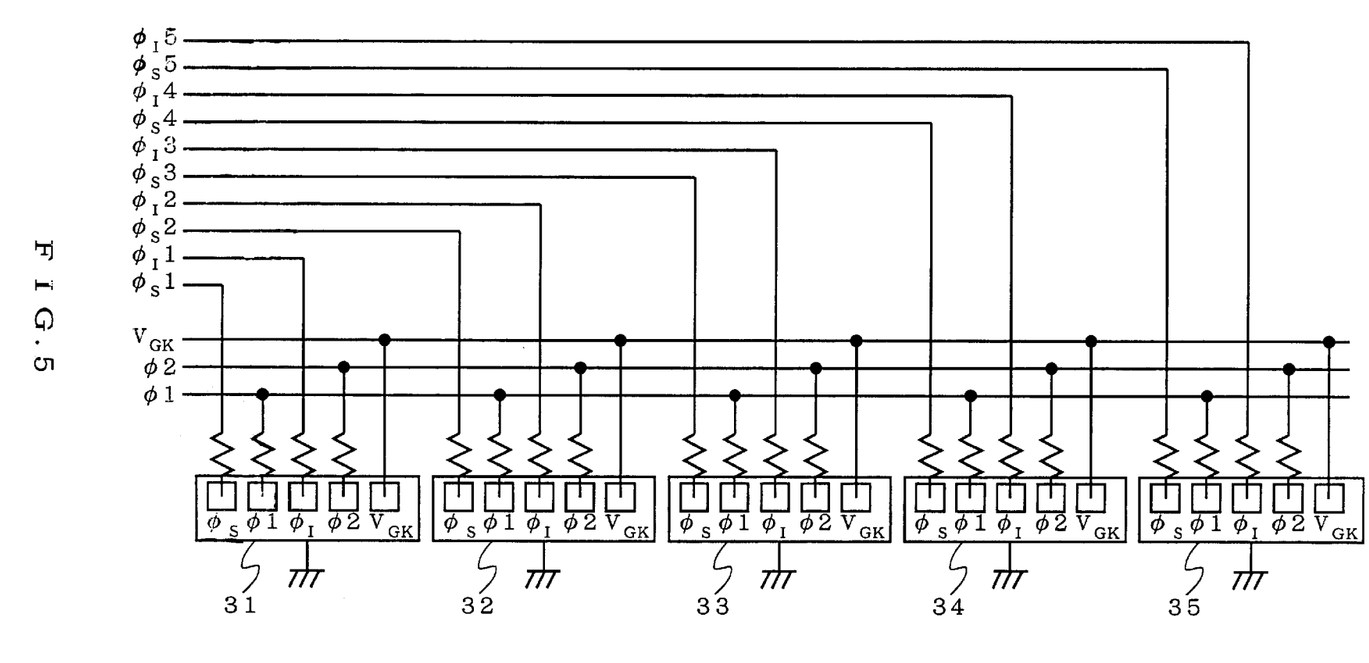
FIG. 5 is a connection diagram of the chips in the embodiment 1.

An example of correction for the deviation of a line of light spots in a self-scanning light-emitting element array composed of five chips arranged in a straight line manner will be illustrated. FIG. 5 shows a connection diagram of the chips. In the figure, reference numerals 31, 32, 33, 34 and 35 designates first, second, third, fourth and fifth chips, respectively. Each chip comprises 128 light-emitting points, and "$\phi_S$", "$\phi 1$", "$\phi 2$", "$\phi_I$" and "$V_{GK}$" written within each chip designate pads for a start pulse $\phi_S$, clock pulses $\phi 1$ and $\phi 2$, a write signal $\phi_I$ and a power supply voltage $V_{GK}$, respectively.

Two-phase clock pulses $\phi 1$, $\phi 2$ and the power supply voltage $V_{GK}$ are commonly applied to respective chips. Start pulses $\phi_S 1$, $\phi_S 2$, $\phi_S 3$, $\phi_S 4$ and $\phi_S 5$, and write signals $\phi_I 1$, $\phi_I 2$, $\phi_I 3$, $\phi_I 4$ and $\phi_I 5$ are in turn supplied to respective chips.

Figure 6:
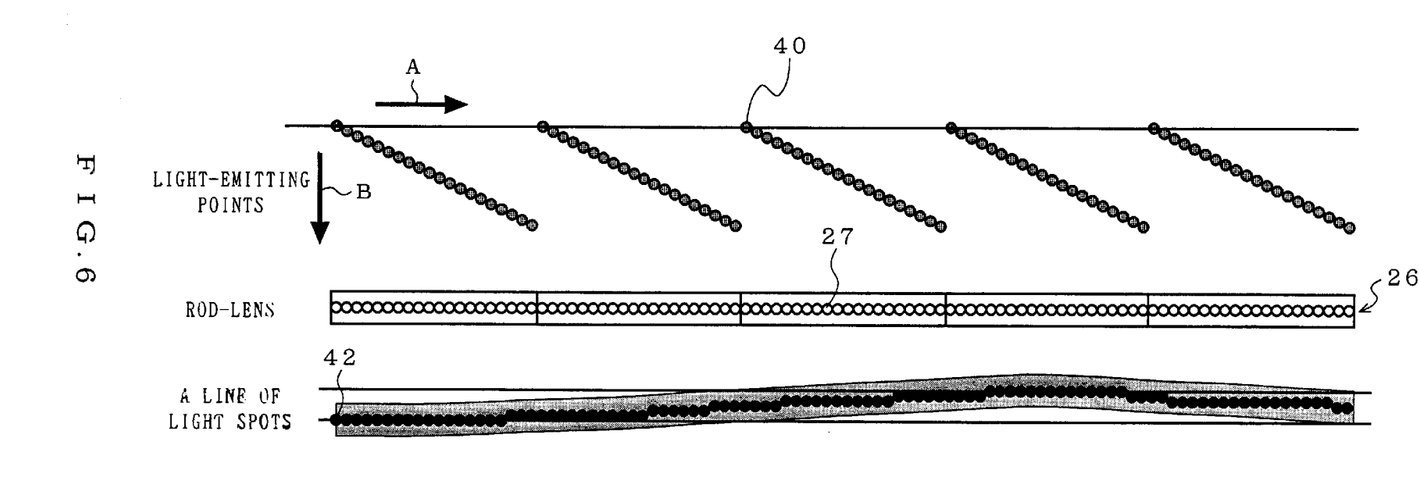
FIG. 6 is a schematic diagram showing the condition of a line of light spots on the photosensitive drum in the case that the deviation of a line of light spots is not corrected.

FIG. 6 shows the condition of a line of light spots on the photosensitive drum in the case that the deviation of a line of light spots is not corrected. An upper portion of the figure shows the situation such that the light up condition of each light-emitting point 40 of each chip is transferred. An arrow "A" denotes a main-scanning direction, and an arrow "B" a sub-scanning direction in the figure. A medium portion of the figure shows a rod-lens array 26 consisting of rod-lenses 27. A lower portion of the figure shows a line of light spots 42 projected onto the drum.

As respective start pulses for the chips are supplied at the same timing, a line of light spots is deviated in a sub-scanning direction due to the manufacturing dispersion of a rod-lens array. In an example of FIG. 6, a line of light spots is deviated in such a manner that a slightly convex line is drawn. The amplitude of this deviation is $(6/128) \times L$ at maximum. "L" is herein a distance across which the photosensitive drum rotates during the transfer operation proceeds from the 1st light-emitting point to the 128th light-emitting point.

Confirming the deviation of a line of light spots in a sub-scanning direction, a data set for correction is formed every chip. The generating timing of each start pulse is shifted based on the data set to correct the deviation of a line of light spots on the drum.

Figure 7:
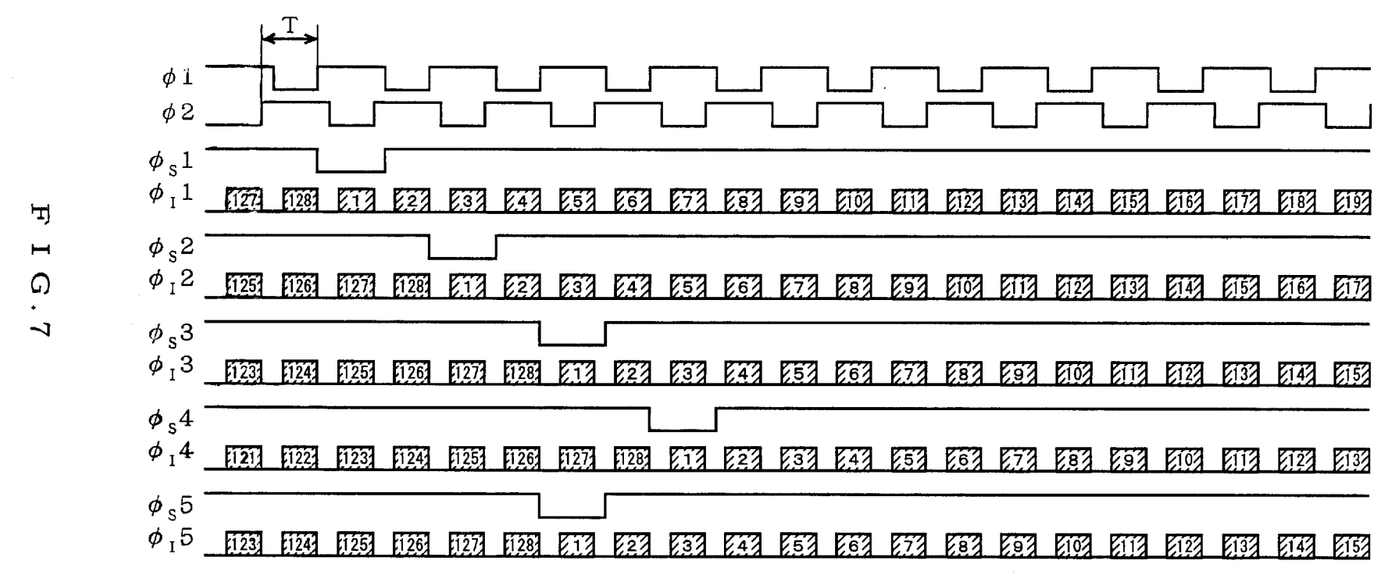
FIG. 7 is a timing diagram of each signal.

FIG. 7 shows the start pulses each thereof is shifted in generating timing. The numerals written in pulse waveforms of each write signal in the figure designate numbers given to each of 128 light-emitting points in each chip. "T" denotes the time difference between the rise timings of the transfer clock pulses $\phi 1$ and $\phi 2$, i.e. the period of light emission of a light-emitting point. It is appreciated from the timing diagram in FIG. 6 that the start pulses $\phi_S 2$, $\phi_S 3$, $\phi_S 4$ and $\phi_S 5$ are delayed by 2T, 4T, 6T and 4T respectively with respect to the start pulse $\phi_S 1$.

Figure 8:
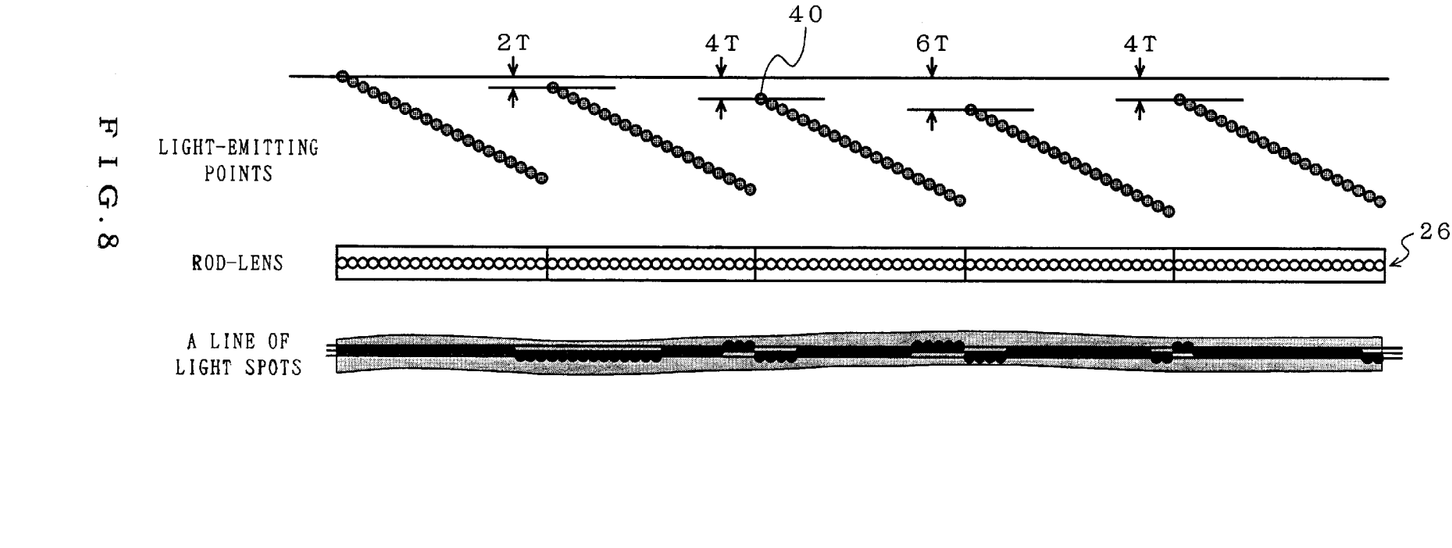
FIG. 8 is a schematic diagram showing a line of light spots projected on the drum after correction.

FIG. 8 shows the situation in which a line of light spots is corrected using the start pulses shown in FIG. 7. As is shown in FIG. 8, when the start pulse $\phi_S 1$ supplied to the first chip 31 is taken as a reference, the start pulse $\phi_S 2$ is supplied to the second chip 32 in a delay of 2T, the start pulse $\phi_S 3$ to the third chip 33 in a delay of 4T, the start pulse $\phi_S 4$ to the fourth chip 34 in a delay of 6T, and the start pulse $\phi_S 5$ to the fifth chip 35 in a delay of 4T. "T" is herein the period of light emission of the light spots as described above.

A line of light spots of each of the second, third, fourth and fifth chips deviates downward by $(2/128) \times L$, $(4/128) \times L$, $(6/128) \times L$ and $(4/128) \times L$, respectively, assuming that the photosensitive drum rotates upwardly in FIG. 8. As a result, the deviation of a line of light spots in a sub-scanning direction may be corrected as shown in FIG. 8.

According to the present embodiment, the correction for the deviation of a line of light spots may be possible in a $(1/64) \times L$ unit by using common $\phi 1$ and $\phi 2$ clock pulses and lighting up a light-emitting point shifted every chip.

EMBODIMENT 2

The start pulse $\phi_S$ of each chip is independently controlled, as shown in FIG. 5, in the embodiment 1. However, a plurality of chips in an optical writing head may be divided into several blocks to control chips in a block by a common start pulse $\phi_S$.

Figure 9:
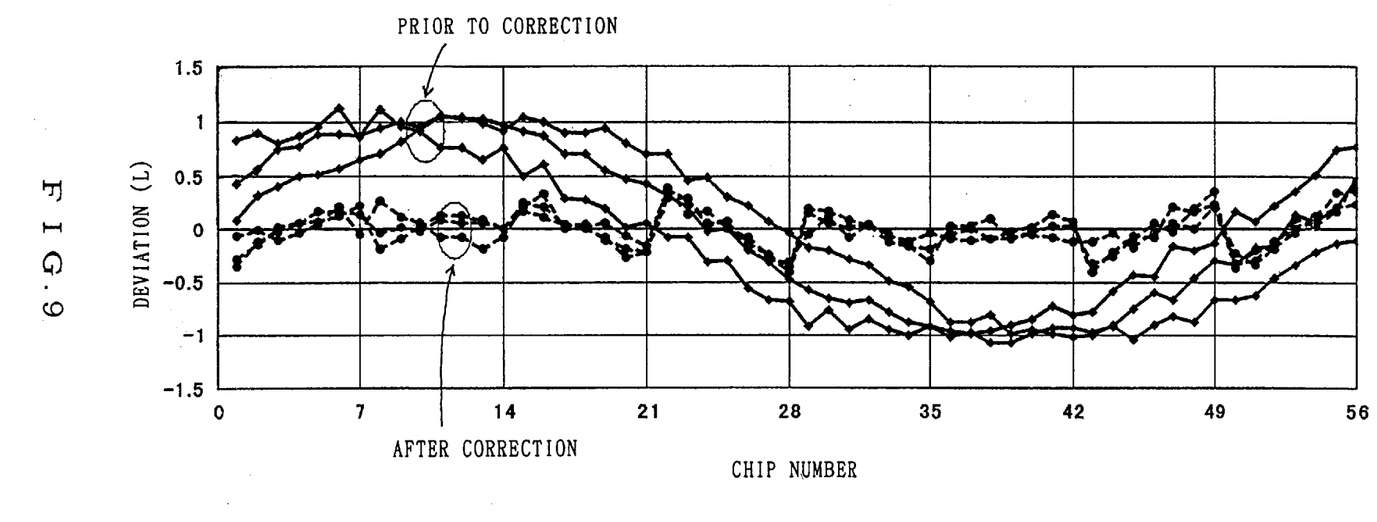
FIG. 9 is a graph showing the experimental result designating the effect of the correction for deviation of a line of light spots in the embodiment 2.

Considering now an optical writing head comprising a self-scanning light-emitting element array consisting of, for example, 56 chips, in which sinusoidal undulation having an amplitude of at most 1×L and about one period has been caused in a line of light spots. In order to suppress the amplitude of undulation of a line of light spots to $(1/3) \times L$ or less for this optical writing head, 56 chips are divided into 8 blocks, i.e. 7 chips per block to regulate the mean value of deviation of lines of light spots in each block by the timing of a common start pulse for each block. As a result, the amplitude of dulation of a line of light spots may be decreased to $(1/3) \times L$ or less. Referring to FIG. 9, there is shown a graph of the experimental result designating the effect of the correction for deviation of a line of light spots. Abscissa denotes a chip number, and ordinate the deviation of light spots. It is recognized from the graph that the amplitude of dulation of a line of light spots is within ±0.5×L.

While a cathode common type of self-scanning light-emitting element array is used in the optical writing heads of the embodiments 1 and 2, an anode common type of self-scanning light-emitting element array may also be used. Further, while two-phase transfer clock pulse is used, three or more-phase clock pulse may also be used.

INDUSTRIAL APPLICABILITY

According to the present invention, it may be possible to correct the deviation of a line of light spots on the photosensitive drum in a sub-scanning direction. Therefore, an optical writing head having a high printing quality may be implemented.

What is claimed is:

1. An optical writing head, comprising:
a self-scanning light-emitting element array consisting of a plurality of chips, each chip including
a self-scanning transfer element array having such a structure that a plurality of three-terminal transfer elements each having a control electrode for controlling threshold voltage or current are arranged, the control electrodes of the transfer elements neighbored to each other are connected via first electrical means, a power supply line is connected to the control electrodes via second electrical means, clock lines are connected to one of two terminals other than the control electrodes of each of the transfer elements, and a start pulse line is connected to the control electrode of the transfer element arranged at an end; and a light-emitting element array having such a structure that a plurality of three-terminal light-emitting elements each having a control electrode for controlling threshold voltage or current are arranged, the control electrodes of the light-emitting element are correspondingly connected to the control electrodes of the transfer elements, and a line for applying a write signal connected to one of two terminals other than the control electrode of each of the light-emitting elements is provided, and
a rod-lens array for projecting light emitted from the self-scanning light-emitting element array onto a light-sensitive drum to form a line of light spots, wherein the timing of a start pulse supplied to the start pulse line every chip is regulated to correct the deviation of the line of light spots due to manufacturing dispersion of the rod-lens.

2. A method for correcting deviation of a line of light spots on a photosensitive drum due to manufacturing dispersion of a rod-lens array in the optical writing head according to claim 1, comprising a step of regulating the timing of a start pulse supplied to the start pulse line to correct the deviation of the line of light spots.

3. An optical writing head, comprising:

a self-scanning light-emitting element array consisting of a plurality of chips, each chip including a self-scanning transfer element array having such a structure that a plurality of three-terminal transfer elements each having a control electrode for controlling threshold voltage or current are arranged, the control electrodes of the transfer elements neighbored to each other are connected via first electrical means, a power supply line is connected to the control electrodes via second electrical means, clock lines are connected to one of two terminals other than the control electrodes of each of the transfer elements, and a start pulse line is connected to the control electrode of the transfer element arranged at an end; and a light-emitting element array having such a structure that a plurality of three-terminal light-emitting elements each having a control electrode for controlling threshold voltage or current are arranged, the control electrodes of the light-emitting element are correspondingly connected to the control electrodes of the transfer elements, and a line for applying a write signal connected to one of two terminals other than the control electrode of each of the light-emitting elements is provided, and a rod-lens array for projecting light emitted from the self-scanning light-emitting element array onto a light-sensitive drum to form a line of light spots, wherein the plurality of chips are divided into blocks each consisting of a given number of chips, one start pulse line is provided every block, and the timing of a start pulse supplied to the one start pulse line is regulated every block to correct the deviation of the line of light spots due to manufacturing dispersion of the rod-lens.

4. The optical writing head of claim 1 or 3, wherein each of the three-terminal transfer element and three-terminal light-emitting element is composed of a light-emitting thyristor having PNPN-structure.

5. The optical writing head of claim 4, wherein the first electrical means is composed of a diode and the second electrical means is composed of a resistor.

6. A method for correcting deviation of a line of light spots on a photosensitive drum due to manufacturing dispersion of a rod-lens array in the optical writing head according to claim 3, comprising the steps of:

dividing a plurality of chips into blocks each consisting of a given number of chips, providing one start pulse lines every block, and regulating the timing of a start pulse supplied to the one start pulse line every block to correct the deviation of the line of light spots due to manufacturing dispersion of the rod-lens.

* * * * *

UNITED STATES PATENT AND TRADEMARK OFFICE
CERTIFICATE OF CORRECTION

PATENT NO.     : 6,657,651 B2
DATED          : December 2, 2003
INVENTOR(S)    : Seiji Ohno It is certified that error appears in the above-identified patent and that said Letters Patent is hereby corrected as shown below:

<u>Title page,</u>
Insert the following Items:

-- [22]  PCT Filed:        Mar. 15, 2001 --.

-- [86]  PCT No.:          PCT/JP01/02042
         §371 (c)(1),
         (2),(4) Date:     Nov. 13, 2001 --.

-- [87]  PCT Pub. No.:     WO01/68372

PCT Pub. Dated:   Sep. 20, 2001 --.

Signed and Sealed this

Twenty-seventh Day of April, 2004

JON W. DUDAS
*Acting Director of the United States Patent and Trademark Office*